United States Patent [19]

Shirasu

[11] Patent Number: 4,777,008
[45] Date of Patent: Oct. 11, 1988

[54] ISOLATING DEVICE FOR A WATER CHAMBER IN A STEAM GENERATOR FOR A NUCLEAR REACTOR

[75] Inventor: Isao Shirasu, Kobe, Japan

[73] Assignee: Mitsubishi Jukogyo Kabushiki Kaisha, Tokyo, Japan

[21] Appl. No.: 797,810

[22] Filed: Nov. 13, 1985

[30] Foreign Application Priority Data

Nov. 15, 1984 [JP] Japan .................. 59-172281[U]

[51] Int. Cl.$^4$ ............................................... G21C 13/00
[52] U.S. Cl. ........................................ 376/204; 138/89
[58] Field of Search .................. 376/203, 204; 138/89; 165/72, 75, 76; 220/332, 333

[56] References Cited

U.S. PATENT DOCUMENTS

| | | | |
|---|---|---|---|
| 3,119,512 | 1/1964 | Foster | 220/333 |
| 3,708,085 | 1/1973 | Bumpas | 220/333 |
| 4,303,368 | 12/1981 | Dent et al. | 165/76 |
| 4,470,946 | 9/1984 | Vassalotti et al. | 376/204 |
| 4,524,729 | 6/1985 | Hill, Jr. et al. | 376/203 |

FOREIGN PATENT DOCUMENTS

| | | |
|---|---|---|
| 121172 | 10/1984 | European Pat. Off. |
| 124824 | 11/1984 | European Pat. Off. |
| 2532715 | 3/1984 | France |

*Primary Examiner*—Deborah L. Kyle
*Assistant Examiner*—Richard L. Klein
*Attorney, Agent, or Firm*—Wenderoth, Lind & Ponack

[57] ABSTRACT

In a steam generator for a pressurized water type nuclear reactor, for the purpose of isolating a water chamber in the steam generator from a coolant piping communicating with the water chamber, a plug is disposed in a nozzle section of the coolant piping, the plug is supported by a support arm having an angle adjusting screw and fixedly secured to a mount seat at a manhole communicating with the water chamber, and preferably, a cover is provided on the mount seat at the manhole.

23 Claims, 4 Drawing Sheets

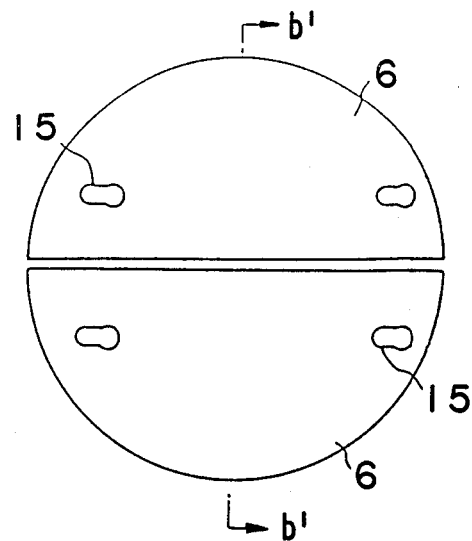
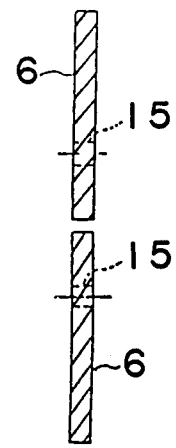
FIG.3a
FIG.3b
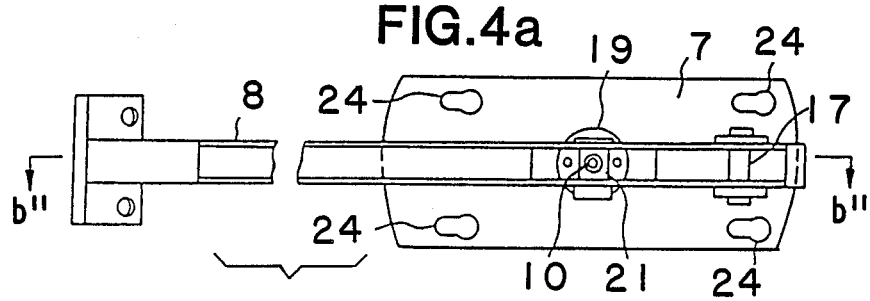
FIG.4a
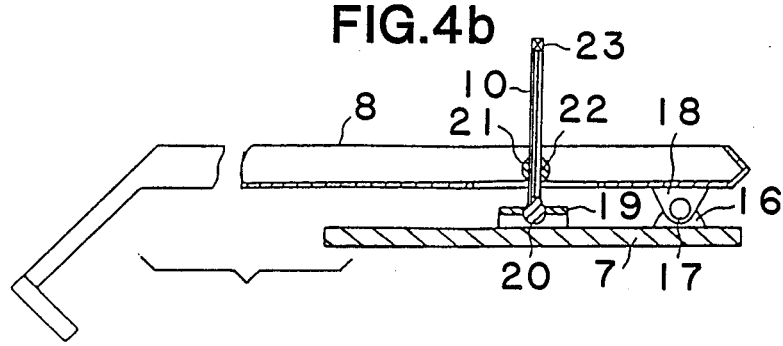
FIG.4b

FIG.5a
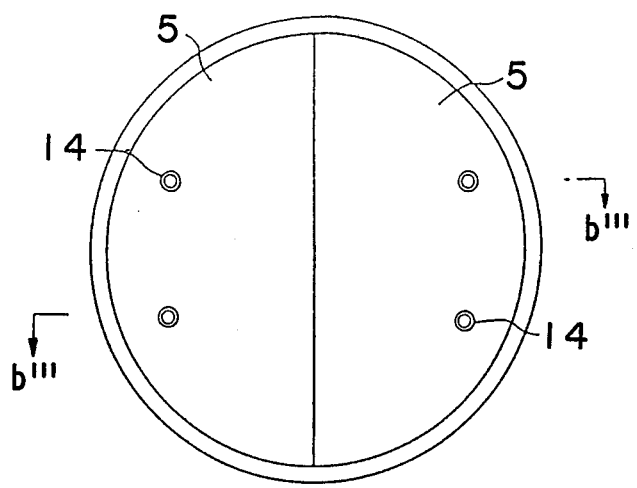
FIG.5b
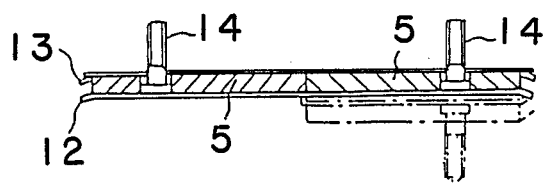
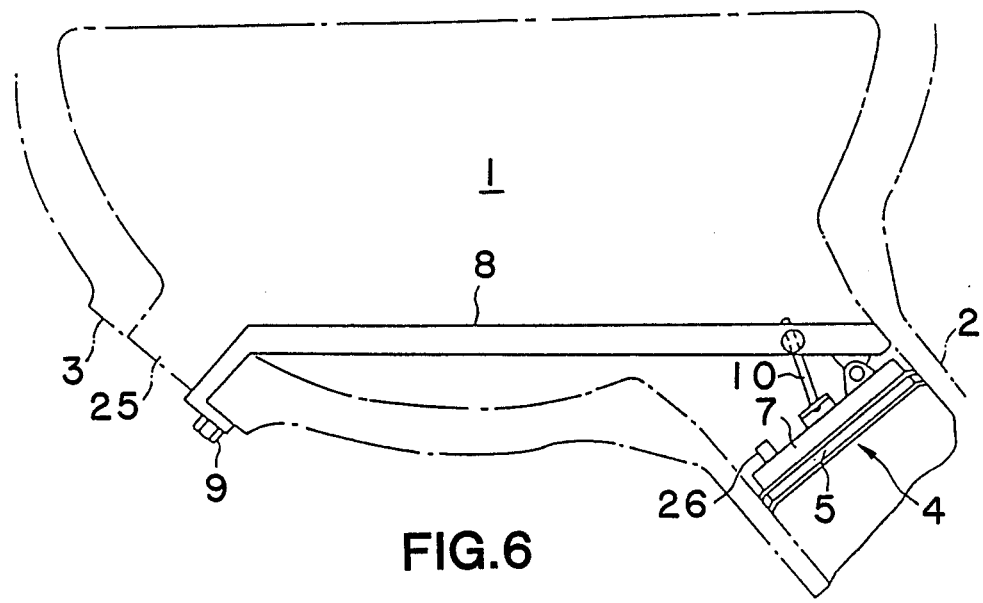
FIG.6

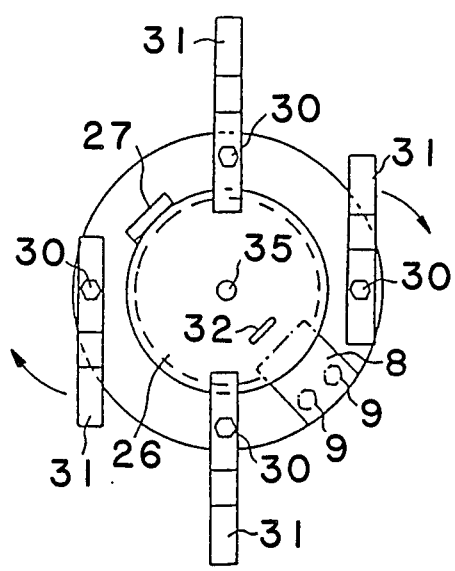
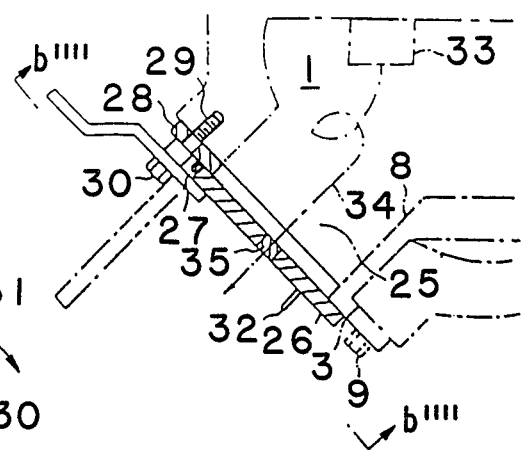
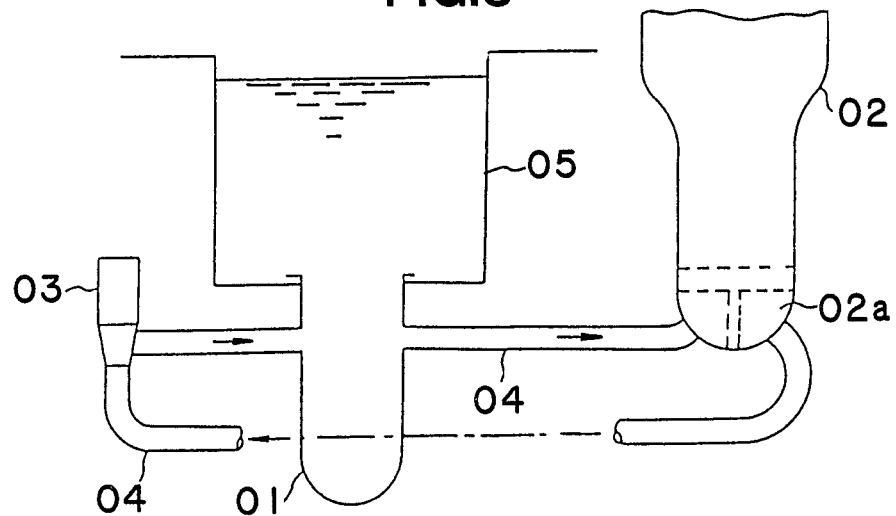

ISOLATING DEVICE FOR A WATER CHAMBER IN A STEAM GENERATOR FOR A NUCLEAR REACTOR

BACKGROUND OF THE INVENTION

1. Field of the Invention

The present invention relates to an isolating device for a water chamber in a steam generator for a nuclear reactor.

2. Description of the Prior Art

In a pressurized water type nuclear reactor, as shown in FIG. 8, a nuclear reactor vessel (01), a water chamber (02a) in a steam generator (02) and a coolant pump (03) are mutually connected with one another by means of coolant pipes (04) to form a coolant circulating loop.

And in an atomic power plant, for the purpose of inspection for confirming safety of the component instruments and the systems as well as replacement of the fuels, operation of the nuclear reactor is interrupted nearly once a year.

Upon the inspection and fuel replacement, tasks relating to the nuclear reactor such as opening of a nuclear reactor vessel, extraction of fuels, inspection of a reactor core, charging of fuels, reassembly of a nuclear reactor, etc. are carried out in shielding water after the nuclear reactor vessel (01), a nuclear reactor cavity (05) and the like have been filled with shielding water. Then, inspection of thin tubes in the steam generator to be effected at that time is necessitated to be carried out under the condition that the water has been extracted, but the tasks relating to the nuclear reactor and the inspection of the thin tubes in the steam generator cannot be performed simultaneously, because the shielding water is filled during the work relating to the nuclear reactor. Accordingly, the time required for the inspection would become long, and this would limit improvement of the rate of operation of the atomic power plant. The present invention has been worked out in view of the above-mentioned background in the art.

SUMMARY OF THE INVENTION

It is therefore one object of the present invention to provide a novel isolating device for a water chamber in a steam generator for a nuclear reactor, which can reliably isolate the water chamber in the steam generator from nuclear reactor coolant pipes, a nuclear reactor vessel, a nuclear reactor cavity and the like and thereby makes it possible to carry out inspection of thin tubes in the steam generator simultaneously with the performance of other tasks relating to the nuclear reactor.

According to one feature of the present invention, there is provided an isolating device for a water chamber in a steam generator for a nuclear reactor which steam generator includes, at its bottom, a water chamber communicating with a nuclear reactor vessel via coolant pipings and having a nozzle section formed between the water chamber and the coolant piping, which isolating device comprises a support arm having its outer end mounted to a manhole section of the water chamber and its inner end butted against an inner surface of the nozzle section, a plug pivotably attached to a tip end portion of the support arm and positioned within the nozzle section, and an angle adjusting screw interposed between the plug and the support arm, the plug being constructed in a foldable manner.

The above-mentioned and other features and objects of the present invention will become more apparent by reference to the following description of preferred embodiments of the invention taken in conjunction with the accompanying drawings.

BRIEF DESCRIPTION OF THE DRAWINGS

In the accompanying drawings:

FIG. 3(a) is a plan view of a hold plate included in the water chamber isolating device in FIG. 1;

FIG. 3(b) is a cross-sectional view of the hold plate taken along line b'—b' in FIG. 3(a);

FIG. 4(a) is a plan view showing an assembled state of a mount plate and a support arm;

FIG. 4(b) is a cross-sectional view taken along line b"—b" in FIG. 4(a);

FIG. 5(a) is a plan view showing a modified embodiment of the sea lid;

FIG. 5(b) is a cross-sectional view taken along line b'''—b''' in FIG. 5(a);

FIG. 6 is a side view of a water chamber isolating device;

FIG. 7(a) is a cross-sectional view showing closure means for a manhole;

FIG. 7(b) is a schematic view taken along line b''''—b'''' in FIG. 7(a) as viewed in the direction of arrows; and FIG. 8 is a system diagram showing an outline of a pressurized water type nuclear reactor.

DETAILED DESCRIPTION OF THE PREFERRED EMBODIMENTS

In the following, a water chamber isolating device (50) according to one preferred embodiment of the present invention will be described in more detail with reference to FIGS. 1 to 7.

Figure 1:
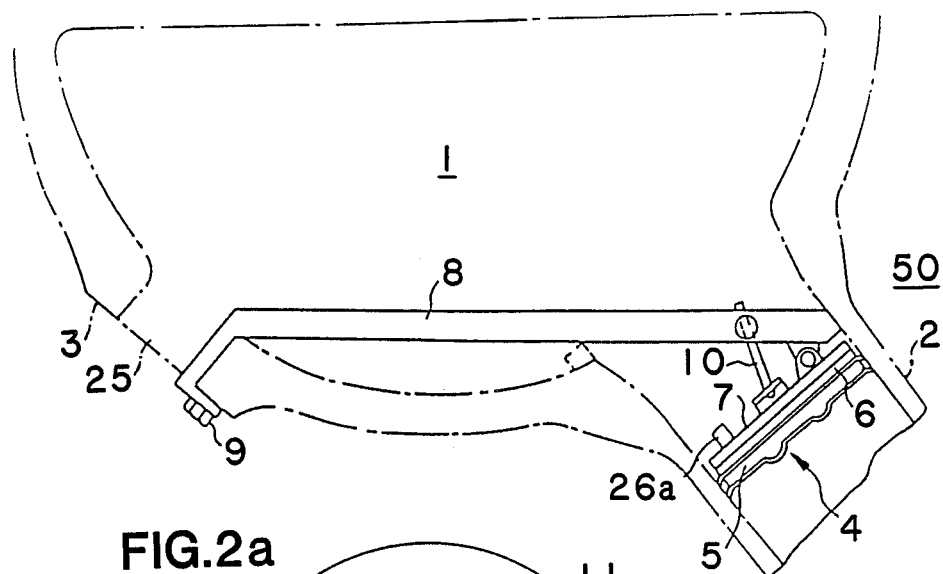
FIG. 1 is a side view of a water chamber isolating device according to one preferred embodiment of the present invention.
Figure 2A:
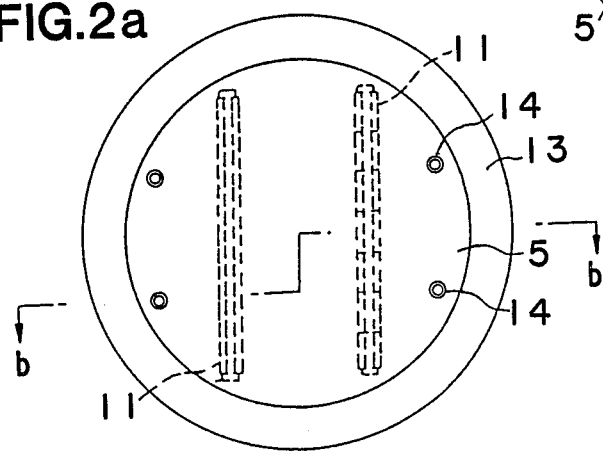
FIG. 2(a) is a plan view of a seal lid included in the water chamber isolating device in FIG. 1.
Figure 2B:
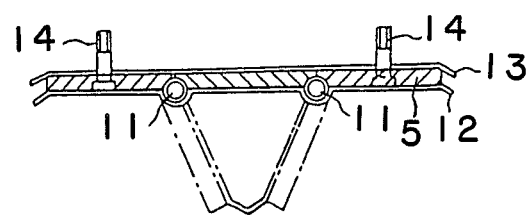
FIG. 2(b) is a cross-sectional view of the seal lid taken along line b—b in FIG. 2(a)

In FIG. 1, a water chamber (1) communicated with a nuclear reactor vessel via coolant piping communicates with a nozzle section (2) of the coolant piping, and at a manhole (25) communicating with the water chamber (1) is formed a mount seat (3) for a cover (not shown). A plug (4) disposed within the nozzle section (2) consists of a circular plate shaped seal lid (5), a hold plate (6), a mount plate (7) and the like, and it occupies a principal portion of the water chamber isolating device (50). A rigid support frame comprising a rigid support arm (8) has its one end detachably secured to the mount seat (3) at the manhole (25) by means of bolts (9) and the other end engaged with an inner wall surface of the nozzle section (2). An attitude of the plug (4) is held in a favorable manner by means of an angle adjusting screw (10) comprising a threaded support rod interposed between the support arm (8) and the mount plate (7). The seal lid (5) has a diameter greater than that of the manhole but is formed of a lid member and hinges (11), the lid member being foldable in three rigid plate-shaped pieces at hinges (11) as shown in FIG. 2(a) (by dash lines) and in FIG. 2(b) (by dash-dot lines) in order that it can be brought into the water chamber (1) through the manhole (25), and onto the bottom and top surfaces of the seal lid (5) are attached rubber seal plates (12) and (13), respectively. In addition, four stud bolts

(14) for integrally fastening the hold plate (6) and the mount plate (7) are fixedly secured to the seal lid (5). The hold plate (6), also having a diameter greater than that of the manhole, is divided into two pieces as shown in FIGS. 3(a) and 3(b) in order that it can be brought into the water chamber (1) through the manhole (25) which is smaller than (has a diameter smaller than that of) the nozzle section (2), and it is provided with mushroom-shaped bolt-holes (15) through which the stud bolts (14) penetrate, in order to facilitate positioning of the hold plate (6). The mount plate (7) is provided with brackets (16) projecting from its top surface at its one end as shown in FIGS. 4(a) and 4(b), and these brackets (16) are pivotably engaged with a pin (17) which is in turn pivotably engaged with brackets (18) projecting from the bottom surface of the support arm (8) at its one end. In addition, in a seat (19) fixedly secured to a central portion of the top surface of the mount plate (7) is fitted a sphere (20) provided at the bottom end of the angle adjusting screw (10) so as to be able to perform a precession motion. The angle adjusting screw (10) is threadedly mated with a threaded hole (22) in a cylindrical pin (21) that is slidably and rotatably supported by the support arm (8) and extends through the hole (22), and a rectangular surface (23) is formed at the top end of the angle adjusting screw (10). In the mount plate (7) are also formed mushroom-shaped bolt-holes (24) through which the stud bolts (14) penetrate, in order to facilitate positioning of the mount plate (7).

Then, under the condition that water has been extracted from the coolant circulating loop including the steam generator and the manhole (25) has been opened, the water chamber isolating device (50) is mounted. More particularly, after the seal lid (5) has been folded in three pieces and thus brought into the water chamber (1) through the manhole (25), it is again extended into a plate shape within the water chamber (1). Subsequently, the hold plate (6) is brought into the water chamber (1) through the manhole (25) as divided into two pieces. Furthermore, the mount plate (7) and the support arm (8) are brought into the water chamber (1) through the manhole (25) in the assembled state as shown in FIGS. 4(a) and 4(b). Then the hold plate (6) is superposed on the seal lid (5), further the mount plate (7) is superposed thereon with the stud bolts (14) penetrated through the mushroom-shaped bolt-holes (15) and (24) to effect positioning, nuts (26a) are threadedly engaged with the top ends of the stud bolts (14) and fastened, and thereby the plug (4) is assembled. Next, if the angle adjusting screw (10) is rotated by engaging a spanner or the like with the rectangular surface (23) formed at the top end of the screw (10), then the plug (4) is rotated about the pin (17) and forms a predetermined angle with respect to the support arm (8). Then, the plug (4) is inserted into the nozzle section (2), and under the condition that the tip end of the support arm (8) is engaged with the inner wall surface of the nozzle section (2), the base end of the support arm (8) is fixedly secured to the mount seat (3) at the manhole (25) by means of the bolts (9). In this way, blocking of the nozzle section (2) by means of the plug (4) is completed. It is to be noted that the seal lid (5) could be modified in such manner that it is divided into two pieces as shown in FIGS. 5(a) and 5(b) and the two pieces are connected by the rubber plate (12) secured to their bottom surfaces so as to be folded in two pieces as shown by dash-dot lines. Moreover, as shown in FIG. 6, the hold plate (6) could be omitted.

Thus, when the blocking of the nozzle section (2) by the plug (4) has been completed, water is poured into the nuclear reactor cavity (05). Then, the water reaches the nozzle section (2) through the coolant piping (04), a hydraulic pressure of about 1 kg/cm$^2$ is exerted upon the bottom surface of the plug (4), hence the rubber plate (12) attached to the bottom surface of the seal lid (5) is brought into press-contact with the inner wall surface of the nozzle section (2) to seal the plug (4), and at the same time, the force applied to the plug (4) by this hydraulic pressure is borne by the inner wall surface of the nozzle section (2) via the tip end of the support arm (8).

In this way, the steam generator can be isolated from the other primary cooling systems, so that under this condition, inspection of the thin tubes in the steam generator can be carried out as by means of a robot or the like, and simultaneously with this thin tube inspection, routine inspection tasks relating to the nuclear reactor can be effected.

In order to prevent leakage water from flowing out of the water chamber (1) in the event that water should leak through the plug (4) provided in the nozzle section (2), the manhole (25) is closed by a cover (26) as shown in FIGS. 7(a) and 7(b). The cover (26) is connected to a seat plate (28) so as to be swingable about a hinge (27), and the seat plate (28) is fastened to the mount seat (3) at the manhole (25) by means of bolts (29) and nuts (30). By rotating levers (31) in the direction of arrows, which levers are mounted so as to be rotatable about the bolts (29), the tip ends of the levers (31) are brought into contact with the outwardly convexed outer surface of the cover (26), and hence the cover (26) is brought into tight contact with the seat plate (28). Reference numeral (32) designates a handle provided on the outer surface of the cover (26), numeral (33) designates a robot for inspection and repair of the thin tubes in the steam generator, numeral (34) designates a cable for controlling the robot (33), which cable extends externally through a seal (35) provided at the center of the cover (26). Upon inspection and repair of the thin tubes in the steam generator, the manhole (25) is opened while the cover (26) is kept in the state shown by dash-dot lines in FIG. 7(a), but in the event that water should leak through the plug (4), the manhole (25) is closed by rotating the cover (26) about the hinge (27) while gripping the handle (32), then the cover (26) is brought into tight contact with the seat plate (28) by rotating the levers (31) about the bolts (29) in the direction of arrows, and thereby the leakage water through the plug (4) is prevented from flowing out through the manhole (25).

According to the present invention, owing to the fact that a plug is disposed in a nozzle section of a coolant piping communicating with a water chamber in a steam generator for a pressurized water type nuclear reactor, the plug is supported by a support arm having an angle adjusting screw and fixedly secured to a mount seat at a manhole communicating with the same water chamber and a cover is provided on the mount seat at the same manhole, the nozzle section of the coolant piping communicating with the water chamber in the steam generator can be blocked by the plug and thereby the steam generator can be isolated from the other primary coolling systems. Accordingly, inspection and repair of thin tubes in the steam generator as well as routine inspection tasks relating to the nuclear reactor can be carried out in parallel and simultaneously, so that the period of routine inspection can be shortened, and therefore, the present invention can contribute to reduction of exposure to radiation and enhancement of an operation rate of an atomic power station. Moreover, since the plug is supported at a predetermined attitude from the support arm fixedly secured to the amount seat at the manhole by means of the angle adjusting screw, and since a hydraulic pressure applied to the plug is borne by the steam generator via the support arm, a special support means is unnecessary. Furthermore, owing to the fact that a cover is provided on the mount seat at the manhole, even if water should leak through the plug, the leakage water can be prevented from flowing out through the manhole.

Since many changes and modifications can be made to the above-described construction without departing from the spirit of the present invention, it is intended that all matter contained in the above description and illustrated in the accompanying drawings shall be interpreted to be illustrative and not as a limitation to the scope of the invention.

What is claimed is:

1. In a nuclear reactor having a nuclear reactor pressure vessel and a steam generator, said steam generator including a vertical outer shell and a water chamber located at a lower end of said outer shell, communicating with said nuclear reactor pressure vessel via coolant piping having a nozzle portion and a manhole in and through a wall of said outer shell of cross-sectional area less than the cross-sectional area of said nozzle portion, the improvement wherein said reactor includes an isolating device for said water chamber which comprises a rigid support frame extending through said manhole to said nozzle portion; a plug; plug mounting means pivotably mounting said plug on a tip end portion of said support frame; and means for adjusting an angle of said plug with respect to said support frame so as to position said plug snugly within said nozzle portion, said angle adjusting means including an adjusting screw extending between said support frame and said plug, said screw being in threaded engagement with one of said support frame and said plug to pivot said plug towards or away from said support frame upon rotation of said screw; said plug including a steel lid and a mount plate, said steel lid including a lid member and two flexible seal plates respectively affixed on opposite faces of said lid member, said mount plate removably attached at a front face thereof to one side of said seal lid with one of said seal plates disposed between said lid member and said mount plate, said lid member having a cross-sectional area grater than said cross-sectional area of said manhole and being formed of at least two rigid plate members and connecting means for pivotably connecting said at least two rigid plate members such that said seal lid is foldable at said connecting means into a shape permitting said seal lid to pass out of said water chamber through said manhole when said mount plate is not attached to said seal lid.

2. The improvement as in claim 1, further comprising means for removably fixing said at least two rigid plate members to said mount plate and for preventing pivotal movement of said at least two rigid plate members relative to each other and said mount plate.

3. The improvement as in claim 2, wherein said removably fixing means includes side-by-side hold plates removably sandwiched between said seal lid and said mount plate, bolts extending from said seal lid through aligned holes in said hold plates and said mount plate, and nuts on said bolts fastening said seal lid, said mount plate and said hold plates together, each of said hold plates having such cross-sectional area as to permit individual passage thereof through said manhole when separated from said seal lid and said mount plate.

4. The improvement as in claim 3, wherein said lid member is circularly plate-shaped, said at least two rigid plate members including two semicircular segment plates and a center plate joined by said connecting means to said segment plates, said connecting means comprising hinges pivotably connecting opposite sides of said center plate to said segment plates, said hold plates forming a circular plate member consisting of two semicircular plates facing each other along diametrically extending edges thereof.

5. The improvement as in claim 4, wherein said two flexible seal plates are circularly shaped and have diameters greater than those of said circular plate member and said lid member, outer peripheral edges of said two flexible seal plates engaging an inner peripheral surface of said nozzle portion.

6. The improvement as in claim 5, wherein said manhole and said nozzle portion have circular cross sections, the diameter of the cross section of said manhole being less than the diameter of the cross section of said nozzle portion.

7. The improvement as in claim 1, further comprising a cover removably closing said manhole in water tight relationship.

8. The improvement as in claim 1, wherein said adjusting screw is a support rod rotatably mounted at one end thereof on said support frame in threaded engagement with said support frame, said support rod engaging a back face of said mount plate opposite said front face at an end of said support rod opposite said one end such that screw rotation of said support rod pivots said plug about said plug mounting means.

9. The improvement as in claim 1, wherein said manhole and said nozzle portion have circular cross sections, the diameter of the cross section of said manhole being less than the diameter of the cross section of said nozzle portion.

10. In a nuclear reactor having a nuclear reactor pressure vessel and a steam generator, said steam generator including a vertical outer shell and a water chamber located at a lower end of said outer shell, communicating with said nuclear reactor pressure vessel via coolant piping having a nozzle portion and a manhole in and through a wall of said outer shell of cross-sectional area less than the cross-sectional area of said nozzle portion, the improvement wherein said reactor includes an isolating device for said water chamber which comprises a rigid support frame extending through said manhole to said nozzle portion; a plug; plug mounting means pivotably mounting said plug on a tip end portion of said support frame; and means for adjusting an angle of said plug with respect to said support frame so as to position said plug snugly within said nozzle portion; said plug including a seal lid and a mount plate, said seal lid including a lid member and two flexible seal plates respectively affixed on opposite faces of said lid member, said mount plate removably attached at a front face thereof to one side of said seal lid with one of said seal plates disposed between said lid member and said mount plate, said lid member having a cross-sectional area greater than said cross-sectional area of said manhole and being formed of at least two rigid plate members and connecting means for pivotably connecting said at least two rigid plate members such that said seal lid is foldable at said connecting means into a shape permitting said seal lid to pass out of said water chamber through said manhole when said mount plate is not attached to said seal lid, and means for removably fixing said at lest two rigid plate members to said mount plate and for preventing pivotal movement of said at least two rigid plate members relative to each other and said mount plate, said removably fixing means including side-by-side hold plates removably sandwiched between said seal lid and said mount plate, bolts extending from said seal lid through aligned holes in said hold plates and said mount plate, and nuts on said bolts fastening said seal lid, said mount plate and said hold plates together, each of said hold plates having such cross-sectional area as to permit individual passage thereof through said manhole when separated from said seal lid and said mount plate.

11. The improvement as in claim 10, wherein said lid member is circularly plate-shaped, said at least two rigid plate members including two semicircular segment plates and a center plate joined by said connecting means to said segment plates, said connecting means comprising hinges pivotably connecting opposite sides of said center plate to said segment plates, said hold plates forming a circular plate member consisting of two semicircular plates facing each other along diametrically extending edges thereof.

12. The improvement as in claim 11, wherein said two flexible seal plates are circularly shaped and have diameters greater than those of said circular plate member and said lid member, outer peripheral edges of said two flexible seal plates engaging an inner peripheral surface of said nozzle portion.

13. The improvement as in claim 12, wherein said manhole and said nozzle portion have circular cross sections, the diameter of the cross section of said manhole being less than the diameter of the cross section of said nozzle portion.

14. The improvement as in claim 10, further comprising a cover removably closing said manhole in water tight relationship.

15. The improvement as in claim 10, wherein said angle adjusting means includes a support rod rotatably mounted at one end thereof on said support frame in threaded engagement with said support frame, said support rod engaging a back face of said mount plate opposite said front face at an end of said support rod opposite said one end such that screw rotation of said support rod pivots said plug about said plug mounting means.

16. In a nuclear reactor having a nuclear reactor pressure vessel and a steam generator, said steam generator including a vertical outer shell and a water chamber located at a lower end of said outer shell, communicating with said nuclear reactor pressure vessel via coolant piping having a nozzle portion and a manhole in and through a wall of said outer shell of cross-sectional area less than the cross-sectional area of said nozzle portion, the improvement wherein said reactor includes an isolating device for said water chamber which comprises a rigid support frame extending through said manhole to said nozle portion; a plug; plug mounting means pivotably mounting said plug on a tip end portion of said support frame; and means for adjusting an angle of said plug with respect to said support frame so as to position said plug snugly within said nozzle portion; said plug including a seal lid and a mount plate, said seal lid including a lid member and two flexible seal plates respectively affixed on opposite faces of said lid member, said mount plate removably attached at a front face thereof to one side of said seal lid with one of said seal plates disposed between said lid member and said mount plate, said lid member having a cross-sectional area greater than said cross-sectional area of said manhole and being formed of at least two rigid plate members and connecting means for pivotably connecting said at least two rigid plate members such that said seal lid is foldable at said connecting means into a shape permitting said seal lid to pass out of said water chamber through said manhole when said mount plate is not attached to said seal lid, said angle adjusting means including a support rod rotatably mounted at one end thereof on said support frame in threaded engagement with said support frame, said support rod engaging a back face of said mount plate opposite said front face at an end of said support rod opposite said one end such that screw rotation of said support rod pivots said plug about said plug mounting means.

17. The improvement as in claim 16, further comprising means for removably fixing said at least two rigid plate members to said mount plate and for preventing pivotal movement of said at least two rigid plate members relative to each other and said mount plate.

18. The improvement as in claim 17, wherein said removably fixing means includes side-by-side hold plates removably sandwiched between said seal lid and said mount plate, bolts extending from said seal lid through aligned holes in said hold plates and said mount plate, and nuts on said bolts fastening said seal lid, said mount plate and said hold plates together, each of said hold plates having such cross-sectional area as to permit individual passage thereof through said manhole when separated from said seal lid and said mount plate.

19. The improvement as in claim 18, wherein said lid member is circularly plate-shaped, said at least two rigid plate members including two semicircular segment plates and a center plate joined by said connecting means to said segment plates, said connecting means comprising hinges pivotably connecting opposite sides of said center plate to said segment plates, said hold plates forming a circular plate member consisting of two semicircular plates facing each other along diametrically extending edges thereof.

20. The improvement as in claim 19, wherein said two flexible seal plates are circularly shaped and have diameters greater than those of said circular plate member and said lid member, outer peripheral edges of said two flexible seal plates engaging an inner peripheral surface of said nozzle portion.

21. The improvement as in claim 20, wherein said manhole and said nozzle portion have circular cross sections, the diameter of the cross section of said manhole being less than the diameter of the cross section of said nozzle portion.

22. The improvement as in claim 16, further comprising a cover removably closing said manhole in water tight relationship.

23. The improvement as in claim 16, wherein said manhole and said nozzle portion have circular cross sections, the diameter of the cross section of said manhole being less than the diameter of the cross section of said nozzle portion.

* * * * *